United States Patent [19]

Klatte et al.

[11] Patent Number: 5,833,739
[45] Date of Patent: Nov. 10, 1998

[54] CHEMICALLY COATED ZEOLITE AND METHOD FOR CHEMICALLY COATING ZEOLITE AND USING COATED ZEOLITE

[76] Inventors: Fred Klatte, Two Spruce St., San Francisco, Calif. 94118; Fernando Cadena, 1600 Candlelight Dr., Las Cruces, N. Mex. 88011

[21] Appl. No.: 554,198

[22] Filed: Nov. 6, 1995

Related U.S. Application Data

[63] Continuation-in-part of Ser. No. 150,438, Nov. 10, 1993, Pat. No. 5,464,598, which is a continuation-in-part of Ser. No. 975,680, Nov. 13, 1992, Pat. No. 5,278,112.

[51] Int. Cl.⁶ .................................................. B01D 53/02
[52] U.S. Cl. .............................. 95/136; 95/116; 95/141; 95/902; 210/691; 502/62; 502/64; 502/60
[58] Field of Search ................... 502/62, 64, 60; 95/141, 116, 136, 902; 210/691

[56] References Cited

U.S. PATENT DOCUMENTS

| | | | |
|---|---|---|---|
| 2,885,368 | 5/1959 | Hess et al. ................. | 502/60 |
| 3,049,399 | 8/1962 | Gamson et al. . | |
| 3,298,780 | 1/1967 | Fleck ........................ | 502/60 |
| 3,536,521 | 10/1970 | McKinney et al. ......... | 502/62 |
| 4,554,261 | 11/1985 | Gergely et al. ............ | 502/62 |
| 4,581,219 | 4/1986 | Imada et al. ............. | 423/605 |
| 4,610,882 | 9/1986 | Laurent et al. ........... | 426/72 |
| 4,835,130 | 5/1989 | Box ........................ | 502/62 |
| 4,871,701 | 10/1989 | Danner et al. ............ | 502/62 |
| 5,264,227 | 11/1993 | Laroche et al. ........... | 426/72 |
| 5,278,112 | 1/1994 | Klatte ..................... | 502/62 |
| 5,302,354 | 4/1994 | Watvedt et al. .......... | 422/177 |
| 5,346,876 | 9/1994 | Ichimura et al. ......... | 502/417 |

FOREIGN PATENT DOCUMENTS

| | | | |
|---|---|---|---|
| 0 063 436 | 10/1982 | European Pat. Off. ................. | 502/60 |
| 0 188 138 | 7/1986 | European Pat. Off. ................. | 502/60 |
| 0 067 521 | 6/1981 | Japan ..................................... | 502/60 |
| 57-34017 | 2/1982 | Japan . | |
| 0 000 827 | 1/1985 | Japan ..................................... | 502/60 |
| 2-198629 | 8/1990 | Japan ............................. | B01J 20/06 |
| 3-23863 | 1/1991 | Japan . | |

OTHER PUBLICATIONS

Material Safety Data Sheet (5 pages), Chemax, Inc. (Jan. 30, 1992).

Cadena, et al., *Treatment of Waters Contaminated with BTX and Heavy Metals Using Tailored Zeolites,* Feb. 1992, New Mexico Waste–Management Education and Research Consortium, Technical Completion Report (Project No. WERC–91–41), 22 pages.

Gao, et al., *Use of Tailored Zeolites for Removal of Benzene and Toluene from Water,* 45th Purdue Industial Waste Conference Proceedings, pp. 509–515, Lewis Publishers, Inc., Chelsea, Michigan, 1991.

Brochure entitled, "Carusorb® 200", by Carus (1 page) (no date).

Translated Atstract of Japanese Appn. 3–23863.

*Primary Examiner*—Michael L. Lewis
*Assistant Examiner*—Thomas G. Dunn, Jr.
*Attorney, Agent, or Firm*—Limbach & Limbach L.L.P.

[57] ABSTRACT

A process for coating zeolite crystals with paraffin, a wax other than paraffin, a fat or oil, or a mixture of at least one QAC and a wax, fat, or oil. Preferably, the crystals are dehydrated until they have about 5% moisture content, and are then mixed with paraffin to produce paraffin-coated zeolite crystals having a desired content of paraffin. When the coated zeolite crystals are used for removing benzene from contaminated water, their paraffin content is preferably about 8% (by weight). Other embodiments are methods for using zeolite coated with paraffin, another wax, a fat, an oil, or a mixture of at least one QAC and a wax, fat, or oil to filter a contaminant from contaminated liquid or gas. The zeolite crystals are optionally impregnated with a chemical such as permanganate before they are coated with the desired wax, fat, oil or mixture. A zeolite crystal having pores coated with wax, fat, oil, or a mixture of at least one QAC and wax, fat, or oil is within the scope of the invention. Another aspect of the invention is a method of filtering contaminants from fluid by exposing the fluid to zeolite crystals coated with a wax, fat, oil, or a mixture of at least one QAC and wax, fat, or oil.

27 Claims, 1 Drawing Sheet

CHEMICALLY COATED ZEOLITE AND METHOD FOR CHEMICALLY COATING ZEOLITE AND USING COATED ZEOLITE

CROSS-REFERENCE TO RELATED APPLICATIONS

The present application is a continuation-in-part of U.S. Pat. application Ser. No. 08/150,438, filed Nov. 10, 1993 now U.S. Pat. No. 5,464,598, which is a continuation-in-part of U.S. Pat. application Ser. No. 07/975,680, filed Nov. 13, 1992, and issued as U.S. Pat. No. 5,278,112 on Jan. 11, 1994. The specifications of U.S. Pat. applications Ser. No. 08/150,438 and Ser. No. 07/975,680 are incorporated herein by reference.

FIELD OF THE INVENTION

The invention relates to processes for chemically coating zeolite crystals, to coated zeolite products of such processes, and to methods for using coated zeolite crystals. Preferred embodiments are processes for coating zeolite crystals with paraffin, and paraffin-coated zeolite crystals.

BACKGROUND OF THE INVENTION

Zeolites are hydrated metal aluminosilicate compounds with well-defined (tetrahedral) crystalline structures. Because zeolite crystals (both natural and synthetic) have a porous structure with connected channels extending through them, they have been employed as molecular sieves for selectively absorbing molecules on the basis of size, shape, and polarity.

Volumes packed with zeolite crystals (for example, small zeolite crystals chosen to have size in the range from 0.2 mm to several millimeters) have been employed in water and air (or other gas) filtration systems to selectively absorb contaminants from a flowing stream of water or gas.

It has been proposed to treat zeolite crystals by impregnating them with quaternary ammonium cations (QACs) such as tetramethylammonium, tetraethylammonium, hexadecyltrimethylammonium, dibenzyldimethylammonium, benzyltriethylammonium, and cetyltrimethylammonium, to enhance the zeolite's capacity to absorb heavy metal, benzene, toluene and xylene contaminants from water. See, for example, Cadena, et al., "Treatment of Waters Contaminated with BTX and Heavy Metals Using Tailored Zeolites," New Mexico Wastemanagement Education and Research Consortium Technical Completion Report for Project No. WERC-91-41 (February 1992). Until the present invention, it had not been known how to treat zeolite (other than by impregnating it with a QAC) to cause the zeolite to function adequately as a molecular sieve for organic chemicals such as benzene, toluene, and xylene.

It has been proposed to impregnate an aqueous solution of permanganate (such as permanganate of potassium, sodium, magnesium, calcium, barium, or lithium) into pores of substrates such as silica gel, alumina, silica-alumina, activated bauxite, and activated clay. The resulting impregnated porous substrates have been employed for filtering and deodorizing air. See for example U.S. Pat. No. 3,049,399, issued Aug. 14, 1962, to Gamson, et al. However, until the invention of above-cited U.S. Pat. No. 5,278,112, it had not been known how to impregnate zeolite crystals uniformly (throughout their volume) with permanganate.

Above-cited U.S. Pat. No. 5,278,112 teaches that under certain conditions, permanganate-impregnated zeolite reacts too rapidly to be practically useful for some air filtration applications. For example, when air contaminated with 50 ppm of hydrogen sulfide is caused to flow (at a rate of 15 liters per minute) through a bed of the inventive permanganate-impregnated zeolite crystals (where the crystals have size about 0.25 inch×0.125 inch, and the bed has volume of 75 cubic centimeters, and dimensions 1"(ld)×6"), the crystals typically become saturated with hydrogen sulfide within about 48 hours. Although the impregnated zeolite crystals usefully absorb hydrogen sulfide from air, the hydrogen sulfide absorption rate is significantly higher than can be achieved using conventional permanganate-impregnated alumina products, and is undesirably high for some applications.

Thus, U.S. Pat. No. 5,278,112 teaches that, for both air (and other gas) and water filtration applications, the rate at which permanganate-impregnated zeolite absorbs selected contaminants can be controlled by coating the impregnated zeolite with a QAC, and similarly, the rate at which QAC-impregnated zeolite absorbs selected contaminants, can be controlled by coating such impregnated zeolite with permanganate.

However, until the present invention, it was not known to use zeolite crystals having pores coated with paraffin, a wax other than paraffin, a fat, or an oil, or a mixture of a wax, fat, or oil with at least one QAC (whether or not the zeolite crystals are impregnated with a chemical such as permanganate before they are coated) to filter contaminants from contaminated liquid or gas. Nor was it known how efficiently to coat pores of zeolite crystals (whether or not chemically impregnated) with paraffin or another wax, fat, or oil (or with a mixture of a wax, fat, or oil with at least one QAC), to produce coated zeolite useful for such applications as filtering benzene or other contaminants from fluid.

SUMMARY OF THE INVENTION

In a class of preferred embodiments, the invention is a process for coating zeolite crystals with paraffin. The product of such process is another embodiment of the invention. Typically, the zeolite crystals are not impregnated with a chemical before being coated, but in some embodiments they are impregnated with potassium permanganate or another chemical before being coated. Preferably, the process includes the steps of: dehydrating zeolite crystals to substantially decrease their moisture content below their initial moisture content (preferably until they have about 5% moisture content), and mixing the dehydrated zeolite crystals with paraffin. The paraffin can be applied as a molten liquid. Alternatively, the paraffin is applied as a powder, the powder is mixed with the zeolite crystals, and the mixed paraffin powder and zeolite is then heated above the melting point of paraffin. The latter procedure can accomplish dehydration of the zeolite crystals and melting of the paraffin in a single heating step, eliminating the need for a separate, preliminary dehydration step. Either procedure can produce zeolite crystals having a desired paraffin content (up to about 10% by weight), with paraffin coated on the zeolitic surface (i.e., on the surface of the pores in each zeolite crystal, at least near the crystal's outer surface and possibly also throughout the crystal's volume).

When the coated zeolite crystals are to be used for removing benzene from contaminated water, the paraffin content of the paraffin-coated zeolite crystals is preferably about 8% (by weight). The physical mechanism which causes this preferred paraffin concentration to be particularly effective for removing benzene is not well understood, but we believe that at the preferred paraffin concentration, pores of each coated zeolite crystal are coated (but not completely filled) with an optimally thick layer of paraffin. We also believe that at paraffin concentrations above the preferred concentration, the pores of the coated zeolite crystals (at least near the outer surface of each crystal) become completely filled with paraffin which decreases the ability of the coated zeolite to remove benzene.

In alternative embodiments of the invention, zeolite crystals are coated with a wax other than paraffin (or with a fat or an oil), or with a mixture of a wax, fat, or oil with one or more QACs, for example to achieve a desired absorption or reaction rate when the coated crystals are used to filter a contaminant from a contaminated liquid or gas. Other embodiments of the invention are methods for using zeolite coated with paraffin, another wax, a fat, or an oil (or a mixture of a wax, fat, or oil with one or more QACs), to filter a contaminant from contaminated liquid or gas.

In some embodiments, one or more QACs are applied directly to coated zeolite (where the zeolite has previously been coated with a wax, fat, or oil), or one or more QACs are mixed with paraffin (or another wax, fat, and oil) and the admixture is coated on zeolite crystals, to obtain a cationic organic matrix. Coated zeolite produced by either method (zeolite coated with a mixture of one or more neutral organics and one or more QACs) exhibit a positive charge in aqueous solutions and can be used to remove organic and inorganic anions from water.

In some embodiments, zeolite impregnated with a chemical such as permanganate is coated with paraffin, another wax, a fat, or an oil to achieve a desired reaction rate of the impregnating substance. The presence of the coating allows regulated time release control of the impregnating substance, and thus permits a controlled diffusion (or absorption) rate in applications in which the coated, impregnated zeolite is employed to filter contaminants from a fluid.

A zeolite crystal whose pores (at least near the outer surface of the crystal) are coated with wax (such as paraffin), fat, or oil (or a mixture of a wax, fat, or oil with one or more QACs) is within the scope of the invention. In some embodiments, the pores in the crystal's interior have been impregnated with a chemical (such as a permanganate) before the coating is applied.

Mixtures of different types of the inventive coated zeolite crystals (e.g., a mixture of coated, impregnated zeolite and coated, non-impregnated zeolite) can be used for a variety of molecular sieving applications such as filtration of contaminants from fluid (e.g., air or water). The composition of each such mixture can be chosen to match specific environmental circumstances calculated by analysis of the fluid to be treated. One result is that mixtures of coated zeolite crystals can be used to absorb or react with organics such as benzene, toluene, and xylene, and/or with hydrogen sulfide, acetone, ethylene glycols, formaldehyde, and other contaminants.

Another aspect of the invention is a method of filtering contaminants from fluid (such as contaminated air or water) by moving the fluid relative to a bed of zeolite crystals coated with wax (e.g., paraffin), fat, or oil (or causing such coated zeolite crystals to flow through a non-flowing volume of the contaminated fluid).

DETAILED DESCRIPTION OF THE PREFERRED EMBODIMENTS

In some embodiments, the interior volumes of zeolite crystals are substantially uniformly impregnated with permanganate such as potassium permanganate before the crystals are coated in accordance with the invention. Throughout the specification, including in the claims, the term "permanganate" used alone refers to any permanganate, including permanganate of potassium, sodium, magnesium, calcium, barium, or lithium.

Figure 1:
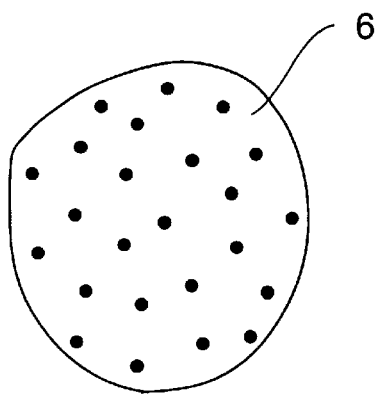
FIG. 1 is a cross-sectional view of a zeolite crystal that has not been impregnated with any chemical.

In preferred embodiments, the invention is a process for coating zeolite crystals (for example, crystals having size 0.125 inch×0.10 inch, 0.25 inch×0.125 inch, 0.125 inch× 0.50 inch, or 0.50 inch×0.75 inch) with paraffin, and the product of such process. FIG. 1 represents such a zeolite crystal that has not been impregnated with any chemical (although the pores in its interior 6 typically contain some naturally occurring moisture).

A preferred embodiment of the inventive process for producing zeolite crystals coated with paraffin includes the steps of: initially dehydrating the zeolite crystals (such as the crystal of FIG. 1) to have about 5% moisture content, and then thoroughly mixing the dehydrated zeolite crystals with paraffin. The paraffin can be applied as a molten liquid on a thin layer of zeolite crystals to accomplish uniform distribution on the zeolite surfaces.

Alternatively, the paraffin is applied as a powder (a granular or pulverized solid), and the powder is mixed with the zeolite crystals using a tumbler or other mechanical mixer. The paraffin-zeolite admixture is then heated in an oven to a temperature above the melting point of paraffin. During this heating step, the zeolite is simultaneously dried and coated with paraffin (thus eliminating the need for a separate zeolite dehydration step preliminary to application of the paraffin).

Either the procedure in which molten paraffin is initially mixed with the zeolite, or that in which paraffin powder is initially mixed with the zeolite, can produce paraffin-coated zeolite crystals having a desired content (up to about 10% by weight) of paraffin. We expect that the latter procedure can typically be accomplished in less than one hour (commencing when the paraffin powder is applied to the zeolite). If the paraffin is applied as a molten material, only the time required to mix and cool the mixed slurry to room temperature is required.

Figure 2:
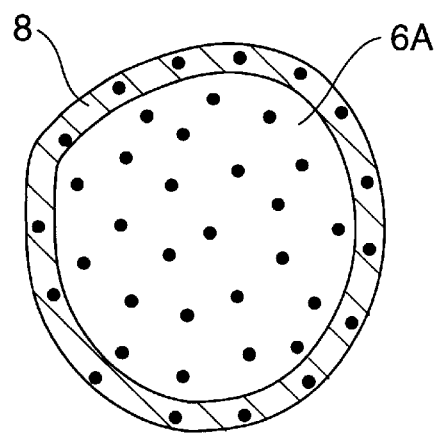
FIG. 2 is a cross-sectional view of the zeolite crystal of FIG. 1, after pores thereof have been coated with paraffin in accordance with the invention.

Typically, the mixed molten paraffin-zeolite slurry (produced in either coating method) is allowed to cool to below the melting point of paraffin to produce zeolite crystals coated with a desired amount of solid paraffin. FIG. 2 is a cross-sectional view of the zeolite crystal of FIG. 1, after it has been coated with paraffin in accordance with the invention (either by applying molten paraffin to a quantity of zeolite crystals including the FIG. 1 crystal, or by applying paraffin powder to a quantity of zeolite crystals including the FIG. 1 crystal and then mixing the crystals and powder and heating the crystal-powder mixture). The coated crystal of FIG. 2 has paraffin 8 in the pores near its surface. The pores in the crystal's interior volume 6A, far from the outer surface of the crystal, may or may not also be coated with significant amounts of the paraffin.

More generally, it is within the scope of the invention to produce zeolite crystals coated with any wax (e.g., paraffin), fat, or oil, by: initially dehydrating the zeolite crystals to substantially decrease their moisture content below their initial moisture content (preferably to have about 5% moisture content), and then thoroughly mixing the dehydrated zeolite crystals with the coating substance. The coating substance can be heated to above its melting point (if the melting point is above the ambient temperature in the production facility) before being applied to the zeolite, or it can be applied in solid form, and then mixed with the zeolite and heated to above its melting point. Either coating method can produce coated zeolite crystals having a desired concentration (by weight) of the coating wax, fat, or oil. The mixed slurry (of zeolite and the coating substance) is allowed to cool to room temperature (if room temperature is below the melting point of the coating substance) to produce (as an end product) zeolite having pores coated with a desired amount of solidified wax, fat, or oil.

When the paraffin-coated zeolite crystals of the invention (e.g., a bed of crystals of the type shown in FIG. 2) are used to remove benzene from contaminated water, the paraffin content of the paraffin-coated zeolite crystals is preferably about 8% (by weight). When zeolite crystals (of a hard, sturdy type of zeolite, rather than a less sturdy type of zeolite which may disintegrate during the coating process) are coated with paraffin in accordance with the invention and then used to remove benzene from contaminated water, we have observed the following relation between the paraffin concentration (by weight) of the coated zeolite and the amount (by weight) of benzene removed from the contaminated water:

| Paraffin Concentration (% by weight) | Benzene Removal (% by weight) |
| --- | --- |
| 0 | 0 |
| 4 | 43 |
| 6 | 81 |
| 8 | 90 |
| 10 | 48. |

While the physical mechanism which causes the 8% paraffin concentration to be optimal for removing benzene is not well understood, we believe that at the preferred (8%) paraffin concentration, the outer pores of each coated zeolite crystal (the pores near each crystal's surface) are coated (but not completely filled or plugged) with an optimally thick layer of paraffin. We also believe that, at paraffin concentrations (e.g., 10%) above the preferred concentration, the outer pores of the coated zeolite crystals become completely filled (plugged) with paraffin, and the ability of the coated zeolite to remove benzene thus decreases.

Typically, zeolite crystals to be coated in accordance with the invention are not impregnated with a chemical before being coated, but in some embodiments the crystals are uniformly impregnated with potassium permanganate or another chemical before being coated. In some embodiments of the latter type, the invention includes the step of thoroughly mixing the impregnated zeolite crystals with molten paraffin (or mixing the impregnated zeolite crystals with powdered paraffin and then heating the mixture) to produce paraffin-coated, impregnated zeolite crystals having a desired paraffin concentration (by weight). Typically, the mixed slurry (zeolite and molten paraffin) is allowed to cool (before use for filtration or other applications) to below the melting point of paraffin to produce zeolite crystals coated with a desired amount of solid paraffin.

More generally, in embodiments in which zeolite crystals have been uniformly impregnated with potassium permanganate or another chemical before being coated, they are coated with any wax (e.g., paraffin), fat, or oil (or a mixture of a wax, oil, or fat with at least one QAC), by thoroughly mixing the impregnated zeolite crystals with the coating substance (which has been heated to above its melting point, if the melting point is above the ambient temperature in the production facility) under conditions chosen to produce coated zeolite crystals having a desired concentration (by weight) of the coating wax, fat, or oil. As described above in connection with preferred embodiments, the coating substance can initially be applied in molten or solid form. If the coating substance is applied in solid form, it is first mixed with the impregnated zeolite and the mixture is then heated to above the melting point of the coating substance (the mixing operation can but need not continue during the heating step).

Figure 3:
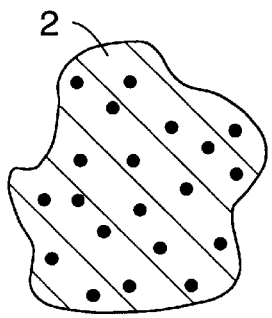
FIG. 3 is a cross-sectional view of a zeolite crystal impregnated with permanganate.
Figure 4:
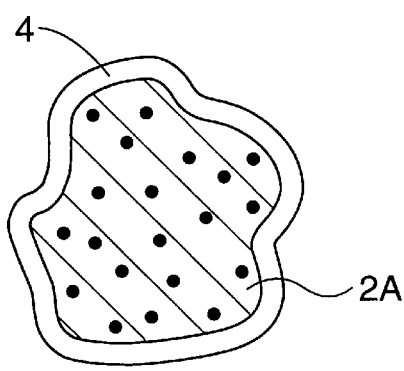
FIG. 4 is a cross-sectional view of the impregnated zeolite crystal of FIG. 3, after pores thereof have been coated with a substance selected from the group consisting of wax (e.g., paraffin), oil, and fat (or a mixture of a wax, oil, or fat with at least one QAC) in accordance with the invention.

FIG. 3 represents a zeolite crystal having pores (channels) uniformly impregnated with potassium permanganate 2 throughout the entire volume of the crystal. FIG. 4 is a cross-sectional view of the impregnated zeolite crystal of FIG. 3, after pores thereof (at least near the outer surface of the crystal) have been coated with a wax, fat, or oil (or a mixture of a wax, oil, or fat with at least one QAC) in accordance with an embodiment of the invention in which the coating substance is applied in molten form to a quantity of zeolite crystals including the FIG. 3 crystal. The coated crystal of FIG. 4 has substance 4 (a wax, fat, or oil, or a mixture of a wax, fat, or oil and at least one QAC) in the pores near its surface, and may (or may not) also have a significant amount of the coating substance in the pores in its interior volume 2A far from the crystal's outer surface.

In some preferred embodiments, the crystals to be coated in accordance with the invention are zeolite crystals uniformly impregnated with potassium permanganate, with a 4% potassium permanganate content and a 15% moisture content. These impregnated crystals are produced by initially dehydrating zeolite crystals to have about 5% moisture content, then mixing the dehydrated zeolite crystals with potassium permanganate crystals (preferably with a weight ratio P/T substantially equal to 4%, where P is the potassium permanganate weight and T is the total weight of the final product of the process), then immersing the crystal mixture in (or spraying the mixture with) water at about 190° F., thoroughly mixing the resulting slurry, and then air drying the mixed slurry to produce potassium permanganate-impregnated zeolite crystals having about 15% moisture content. Typically, the process employs four pounds of potassium permanganate and fifteen pounds of water for every 86 pounds of dehydrated (5% moisture) zeolite crystals, and this mixture (105 pounds) is dried to produce 100 pounds of permanganate-impregnated zeolite crystals having about 15% moisture content.

Variations on the method described in the previous paragraph produce zeolite crystals uniformly impregnated with potassium permanganate, having a potassium permanganate content of X%, where X is greater than 4, and is preferably in the range from 8 to 10. In such variations, the dehydrated zeolite crystals are mixed with solid potassium permanganate with a weight ratio P/T substantially equal to X%, where P is the potassium permanganate weight and T is the total weight of the final product of the process.

In variations on the methods described in the two previous paragraphs, permanganate other than potassium permanganate (such as permanganate of sodium, magnesium, calcium, barium, or lithium) is employed to impregnate the zeolite crystals.

For many applications (including air and water filtration applications), the desired concentration of potassium permanganate impregnated in zeolite crystals (to be coated) is in the range from about 1% to about 4% (or from about 1 to about 8% or 10%).

However, the permanganate-impregnated zeolite may have an activity rate too high or too low for some useful applications (i.e., its rate of absorption of contaminants may be too high, or too low, for some air or water filtration applications). We have found that the rate at which permanganate-impregnated zeolite absorbs (or reacts with, or both absorbs and reacts with) selected contaminants can be controlled (and reduced or increased to a desired level) by applying a coating of wax, fat, or oil to the impregnated zeolite.

A mixture of different types of coated zeolite can be used for absorbing (and/or reacting with) any of a wide variety of contaminants (or contaminant groups) in fluid (such as air or water). The composition of each such mixture can be chosen to match specific environmental circumstances calculated by analysis of the fluid to be treated. The optimal mixture for each desired use can be determined experimentally.

We have found that paraffin-coated zeolite is preferable to QAC-impregnated zeolite (that is not paraffin-coated) for removing contaminants from contaminated water, for several reasons including the following. A semitoxic, soapy waste usually remains on such QAC-impregnated zeolite after exposure to contaminated water, and at least two or three rinses are usually needed to remove this waste. In contrast, only a slightly turbid waste remains on paraffin-coated zeolite crystals after exposure to contaminated water, and this slightly turbid waste can usually be removed by only one wash.

In many embodiments, zeolite crystals for coating in accordance with the invention should be chosen to consist of a hard, sturdy type of zeolite, rather than a less sturdy type of zeolite which may disintegrate during the coating process.

Another aspect of the invention is filtration of contaminants from a fluid (such as contaminated air or water) by moving the fluid relative to a bed of zeolite crystals coated with wax (such as paraffin), fat, or oil. Alternatively, such coated zeolite crystals are caused to flow through a non-flowing volume of such fluid.

Figure 5:
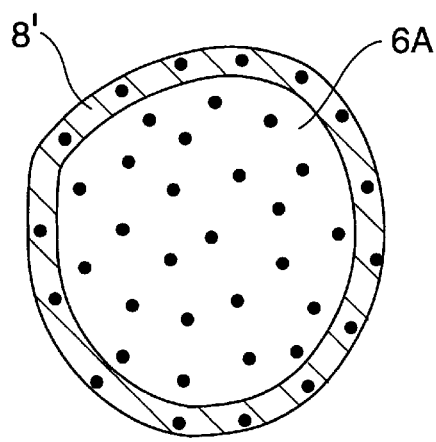
FIG. 5 is a cross-sectional view of the zeolite crystal of FIG. 1, after pores thereof have been coated with a mixture of paraffin and a QAC in accordance with the invention.

We have also recognized that if zeolite is coated with a mixture of paraffin (or another neutral organic substance) and a QAC, the coated zeolite will have a positive charge in aqueous solutions and the coated zeolite will act as an anion exchange resin. FIG. 5 is a cross-sectional view of the zeolite crystal of FIG. 1, after it has been coated with a mixture of paraffin and a QAC in accordance with an embodiment of the invention (e.g., by applying mixed molten paraffin and aqueous QAC to a quantity of zeolite crystals including the FIG. 1 crystal). The coated crystal of FIG. 5 has a coating 8' of mixed paraffin and QAC in the pores near its surface, and may (or may not) also have significant amounts of this mixture in the pores in its interior volume 6A far from the outer surface of the crystal. Such coated zeolite (zeolite having pores coated with at least one wax, fat, or oil mixed with at least one QAC) can be employed for filtering anionic pollutants as well as neutral organics from fluids. For example, such coated zeolite can be used to filter arsenic, chromates, arsenates, and radionuclides from water. Such coated zeolite can also be used for other applications such as pharmaceutical, catalysis, disinfection, and chemical separation applications.

Various modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A zeolite crystal coated with a substance, produced as a result of a method including the steps of:
   (a) dehydrating zeolite crystals containing at least some water to decrease their moisture content below their initial moisture content, thereby producing dehydrated zeolite crystals; and
   (b) after step (a), mixing the dehydrated zeolite crystals with the substance, thereby producing zeolite crystals coated with the substance, wherein said substance is selected from the group consisting of waxes, mixtures of at least one QAC and at least one wax, mixtures of at least one QAC and at least one fat, and mixtures of at least one QAC and at least one oil.

2. A method, including the steps of:
   (a) impregnating zeolite crystals with a first substance selected from the group consisting of permanganates and quaternary ammonium cations, thereby producing impregnated zeolite crystals; and
   (b) after step (a), mixing the impregnated zeolite crystals with a second substance in a liquid state selected from the group consisting of waxes, fats, oils, mixtures of at least one QAC and at least one wax, mixtures of at least one QAC and at least one fat, and mixtures of at least one QAC and at least one oil, thereby producing impregnated zeolite crystals coated with the second substance.

3. The method of claim 2, wherein the second substance is paraffin.

4. The method of claim 3, wherein the zeolite crystals coated with paraffin have a paraffin content of from 7% to 9% by weight.

5. The method of claim 4, wherein the zeolite crystals coated with paraffin have a paraffin content of 8% by weight.

6. A zeolite crystal coated with paraffin, produced as a result of the method of claim 3.

7. The method of claim 2, wherein the second substance has a melting point, and also including the step of:
   (c) after step (b), cooling the zeolite crystals coated with the second substance to below the melting point of said second substance.

8. A zeolite crystal coated with said second substance, produced as a result of the method of claim 2.

9. The method of claim 2, wherein step (a) includes the step of impregnating the zeolite crystals with a permanganate.

10. The method of claim 2, also including the step of:
    exposing the impregnated zeolite crystals coated with the second substance to a contaminated fluid that is a member of the group consisting of contaminated air and contaminated water, to absorb from the contaminated fluid a contaminant that is an organic chemical.

11. The method of claim 10, wherein the contaminant is benzene.

12. The method of claim 10, wherein the contaminant is toluene.

13. The method of claim 10, wherein the contaminant is xylene.

14. The method of claim 2, also including the step of: exposing the impregnated zeolite crystals coated with the second substance to a contaminated fluid that is a member of the group consisting of contaminated air and contaminated water, to absorb from the contaminated fluid a contaminant that is a member of the group consisting of hydrogen sulfide, acetone, ethylene glycols, and formaldehyde.

15. A zeolite crystal coated with at least one substance selected from the group consisting of waxes, mixtures of at least one QAC and at least one wax, mixtures of at least one QAC and at least one fat, and mixtures of at least one QAC and at least one oil.

16. The crystal of claim 15, wherein said at least one substance is a wax.

17. The crystal of claim 15, wherein said at least one substance is paraffin.

18. The crystal of claim 17, having a paraffin content of from 7% to 9% by weight.

19. The crystal of claim 18, having a paraffin content of 8% by weight.

20. The crystal of claim 15, having a size sufficient for filtering a contaminant from a contaminated fluid.

21. A method, including the steps of:
(a) dehydrating zeolite crystals containing at least some water to decrease their moisture content below their initial moisture content, thereby producing dehydrated zeolite crystals;
(b) after step (a), mixing the dehydrated zeolite crystals with a substance selected from the group consisting of waxes, fats, oils, mixtures of at least one QAC and at least one wax, mixtures of at least one QAC and at least one fat, and mixtures of at least one QAC and at least one oil, thereby producing zeolite crystals coated with the substance; and
exposing the zeolite crystals coated with said substance to a contaminated fluid that is a member of the group consisting of contaminated air and contaminated water, to absorb from the contaminated fluid a contaminant that is an organic chemical.

22. A method, including the steps of:
(a) applying a substance in solid form to the zeolite crystals, said substance having a melting point, and said substance being selected from the group consisting of waxes, fats, oils, mixtures of at least one QAC and at least one wax, mixtures of at least one QAC and at least one fat, and mixtures of at least one QAC and at least one oil;
(b) after step (a), mixing the zeolite crystals with the substance, thereby producing a mixture;
(c) heating the mixture to a temperature above the melting point of the substance, thereby producing zeolite crystals coated with the substance; and
exposing the zeolite crystals coated with said substance to a contaminated fluid that is a member of the group consisting of contaminated air and contaminated water, to absorb from the contaminated fluid a contaminant that is an organic chemical.

23. The method of claim 22, wherein the contaminant is benzene.

24. The method of claim 22, wherein the contaminant is toluene.

25. The method of claim 22, wherein the contaminant is xylene.

26. A method, including the steps of:
(a) dehydrating zeolite crystals containing at least some water to decrease their moisture content below their initial moisture content, thereby producing dehydrated zeolite crystals;
(b) after step (a), mixing the dehydrated zeolite crystals with a substance selected from the group consisting of waxes, fats, oils, mixtures of at least one QAC and at least one wax, mixtures of at least one QAC and at least one fat, and mixtures of at least one QAC and at least one oil, thereby producing zeolite crystals coated with the substance; and
exposing the zeolite crystals coated with said substance to a contaminated fluid that is a member of the group consisting of contaminated air and contaminated water, to absorb from the contaminated fluid a contaminant that is a member of the group consisting of hydrogen sulfide, acetone, ethylene glycols, and formaldehyde.

27. A method, including the steps of:
(a) applying a substance in solid form to the zeolite crystals, said substance having a melting point, and said substance being selected from the group consisting of waxes, fats, oils, mixtures of at least one QAC and at least one wax, mixtures of at least one QAC and at least one fat, and mixtures of at least one QAC and at least one oil;
(b) after step (a), mixing the zeolite crystals with the substance, thereby producing a mixture;
(c) heating the mixture to a temperature above the melting point of the substance, thereby producing zeolite crystals coated with the substance; and
exposing the zeolite crystals coated with said substance to a contaminated fluid that is a member of the group consisting of contaminated air and contaminated water, to absorb from the contaminated fluid a contaminant that is a member of the group consisting of hydrogen sulfide, acetone, ethylene glycols, and formaldehyde.

* * * * *